United States Patent
Turner (10) Patent No.: US 10,889,388 B2
(45) Date of Patent: Jan. 12, 2021

(54) INCLINED GEOSYNCHRONOUS ORBIT SPACECRAFT CONSTELLATIONS

(71) Applicant: Space Systems/Loral, LLC, Palo Alto, CA (US)

(72) Inventor: Andrew E. Turner, Mountain View, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 726 days.

(21) Appl. No.: 15/441,032

(22) Filed: Feb. 23, 2017

(65) Prior Publication Data

US 2017/0247123 A1    Aug. 31, 2017

Related U.S. Application Data

(60) Provisional application No. 62/300,667, filed on Feb. 26, 2016, provisional application No. 62/300,682, (Continued)

(51) Int. Cl.
*B64G 1/24* (2006.01)
*B64G 1/10* (2006.01)
(Continued)

(52) U.S. Cl.
CPC ............ *B64G 1/242* (2013.01); *B64G 1/007* (2013.01); *B64G 1/1007* (2013.01); (Continued)

(58) Field of Classification Search
CPC .... B64G 1/242; B64G 1/1085; B64G 1/1007; B64G 1/007; B64G 1/40; B64G 1/405
See application file for complete search history.

(56) References Cited

U.S. PATENT DOCUMENTS

| | | |
|---|---|---|
| 3,836,969 A | 9/1974 | Bond et al. |
| 3,995,801 A | 12/1976 | Bond |

(Continued)

FOREIGN PATENT DOCUMENTS

| | | |
|---|---|---|
| DE | 22 52 370 A1 | 5/1973 |
| EP | 0 575 678 A1 | 9/1992 |

(Continued)

OTHER PUBLICATIONS

Shan, J. et al., "Optimization of Injection Parameters for Slightly Inclined Geosynchronous Orbits"; 54th AIAA Aerospace Sciences Meeting, AIAA SciTech, (AIAA 2016-0217).

(Continued)

*Primary Examiner* — Valentina Xavier
(74) *Attorney, Agent, or Firm* — Weaver Austin Villeneuve & Sampson LLP (57) ABSTRACT

A constellation of Earth-orbiting spacecraft includes a first spacecraft disposed in a first orbit and a second spacecraft disposed in a second orbit. Each of the first orbit and the second orbit is substantially circular with a radius of approximately 42,164 km. The first orbit and the second orbit have a respective inclination with respect to the equator within a range of 5° to 20°. The first orbit has a first right ascension of ascending node (RAAN1) and the second orbit has a second RAAN (RAAN2) of approximately RAAN1+ 90°.

20 Claims, 8 Drawing Sheets

Related U.S. Application Data filed on Feb. 26, 2016, provisional application No. 62/300,685, filed on Feb. 26, 2016.

(51) Int. Cl.
*B64G 1/00* (2006.01)
*B64G 1/40* (2006.01)

(52) U.S. Cl.
CPC ............ *B64G 1/1085* (2013.01); *B64G 1/40* (2013.01); *B64G 1/405* (2013.01)

(56) References Cited

U.S. PATENT DOCUMENTS

| | | |
|---|---|---|
| 4,502,051 A | 2/1985 | Dondl |
| 4,809,935 A | 3/1989 | Draim |
| 5,120,007 A | 6/1992 | Pocha et al. |
| 5,619,211 A | 4/1997 | Horkin et al. |
| 5,813,634 A | 9/1998 | Pizzicaroli et al. |
| 6,305,646 B1 | 10/2001 | McAllister et al. |
| 6,389,336 B2 | 5/2002 | Cellier |
| 7,255,308 B1 | 8/2007 | Murphy |
| 7,720,604 B1 | 5/2010 | Cichan et al. |
| 8,016,240 B2 | 9/2011 | Caplin et al. |
| 10,543,937 B2 | 1/2020 | Stratemeier et al. |
| 2001/0041950 A1 | 11/2001 | Cellier |
| 2002/0160710 A1* | 10/2002 | Castiel ............ H04B 7/195 455/12.1 |
| 2004/0056146 A1 | 3/2004 | Goodzeit et al. |
| 2006/0240767 A1 | 10/2006 | Jacomb-Hood et al. |
| 2008/0027595 A1 | 1/2008 | Fowler et al. |
| 2008/0307466 A1 | 12/2008 | Wang |
| 2013/0002484 A1 | 1/2013 | Katz |
| 2014/0017992 A1 | 1/2014 | Bigras et al. |
| 2014/0339368 A1 | 11/2014 | Majer |
| 2015/0158602 A1 | 6/2015 | Marshack et al. |
| 2015/0158603 A1 | 6/2015 | Marshack et al. |
| 2015/0197350 A1 | 7/2015 | Ho |
| 2015/0268349 A1 | 9/2015 | Veysoglu et al. |

FOREIGN PATENT DOCUMENTS

| | | | |
|---|---|---|---|
| EP | 0 836 290 A2 | 4/1998 | |
| EP | 1022867 A2 * | 7/2000 | ............ H04B 7/195 |
| GB | 2 288 038 A | 10/1995 | |
| WO | WO 2008/013592 A2 | 1/2008 | |
| WO | WO 2009/013404 A2 | 1/2009 | |

OTHER PUBLICATIONS

Jiancheng, L., "Separation of Geostationary Satellites With Eccentricity and Inclination Vector," 2009 International Conference on Measuring Technology and Mechatronics Automation, IEEE, 2009, 855-858.

U.S. Notice of Allowance dated Feb. 15, 2019 issued in U.S. Appl. No. 15/441,040.

International Preliminary Report on Patentability dated Sep. 7, 2018 issued in PCT/US2017/019515.

International Preliminary Report on Patentability dated Sep. 7, 2018 issued in PCT/US2017/019437.

International Preliminary Report on Patentability dated Sep. 7, 2018 issued in PCT/US2017/019475.

International Search Report and Written Opinion dated Jun. 22, 2017 issued in PCT/US2017/019437.

International Search Report and Written Opinion dated Jun. 21, 2017 issued in PCT/US2017/019515.

International Search Report and Written Opinion dated Jun. 7, 2017 issued in PCT/US2017/019475.

Kechichian J A: "Orbit Plane Control Strategies for Inclined Geosynchronous Satellite Constellation", Journal of Spacecraft and Rockets, American Institute of Aeronautics and Astronautics,Reaston,VA, US, val. 35, No. 1, Jan. 1, 1998 (Jan. 1, 1998 ), pp. 46-54, XP000741314, ISSN: 0022-4650.

U.S. Notice of Allowance dated Sep. 30, 2019 issued in U.S. Appl. No. 15/441,037.

U.S. Office Action dated May 28, 2019 issued in U.S. Appl. No. 15/441,037.

\* cited by examiner

INCLINED GEOSYNCHRONOUS ORBIT SPACECRAFT CONSTELLATIONS

CROSS-REFERENCE TO RELATED APPLICATIONS

This disclosure claims priority to U.S. Provisional Patent Application No. 62/300,667, filed Feb. 26, 2016, entitled "CONSTELLATION OF TWO SPACECRAFT IN INCLINED GEOSYNCHRONOUS ORBIT," to U.S. Provisional Patent Application No. 62/300,682, filed Feb. 26, 2016, entitled "STATIONKEEPING TECHNIQUES FOR SPACECRAFT IN INCLINED GEOSYNCHRONOUS ORBIT," and to U.S. Provisional Patent Application No. 62/300,685, filed Feb. 26, 2016, entitled "EFFICIENT ORBITAL STORAGE AND DEPLOYMENT FOR SPACECRAFT IN INCLINED GEOSYNCHRONOUS ORBIT" each assigned to the assignee hereof, the disclosures of which are hereby incorporated by reference in their entirety into this Patent Application for all purposes.

TECHNICAL FIELD

This invention relates generally to communications satellites, and more particularly to improved techniques for providing continuous communications services to a region on the surface of Earth from two spacecraft operating in a moderately inclined circular geosynchronous orbit.

BACKGROUND

The assignee of the present invention manufactures and deploys spacecraft for, inter alia, communications, broadcast services and/or imaging services. Many satellite services are provided from spacecraft in geosynchronous equatorial orbit (GEO), a circular, equatorial orbit having a radius of 42,164 kilometers and an orbital period of one sidereal day of (23 hr 56 min. 4 seconds, the period of rotation of Earth in inertial space). A satellite in GEO appears stationary to a ground station on the earth and can provide coverage to a significant portion of the globe at latitudes (the "GEO coverage latitudes") between about 70° N and 70° S. Because longitudes ("slots") at which spacecraft may be stationed in GEO (i.e., available locations on the GEO "arc") are limited, it is desirable to find techniques for providing a service coverage region size similar to existing geostationary spacecraft, while avoiding use of the GEO arc and avoiding interference with satellites operating in the GEO arc.

The present applicant has developed improved techniques for deploying and operating a constellation of spacecraft arranged in moderately inclined orbits. For example, in a related patent application, filed concurrently herewith and entitled "Stationkeeping Techniques for Spacecraft in Inclined Geosynchronous Orbit", owned by the assignee of the present application, techniques are described for performing stationkeeping of satellites arranged in moderately inclined orbits. As a further example, in a related patent application, filed concurrently herewith and entitled "Orbital Storage and Deployment for Spacecraft in Inclined Geosynchronous Constellations", owned by the assignee of the present application, techniques are described for disposing spare on-orbit spacecraft capable of replacing any spacecraft in the constellation when called up.

The disclosures of the above mentioned patent applications are hereby incorporated in their entirety into the present application for all purposes.

SUMMARY

The presently disclosed techniques relate to improved techniques for providing continuous communications services to a region on the surface of Earth from two spacecraft operating in a moderately inclined circular geosynchronous orbit.

According to some implementations, a constellation of Earth-orbiting spacecraft includes a first spacecraft disposed in a first orbit and a second spacecraft disposed in a second orbit. Each of the first orbit and the second orbit is substantially circular with a radius of approximately 42,164 km. The first orbit and the second orbit have a respective inclination with respect to the equator within a range of 5° to 20°. The first orbit has a first right ascension of ascending node (RAAN1) and the second orbit has a second RAAN (RAAN2) of approximately RAAN1+90°.

In some examples, the first spacecraft and the second spacecraft may each be located at a substantially similar median longitude and the constellation may be configured such that the first spacecraft reaches a point of maximum northerly latitude at approximately the same time that the second spacecraft is crossing the equator moving northward.

In some examples, the first orbit may have a right ascension of ascending node (RAAN) of approximately 315° and the second orbit may have a RAAN of approximately 45°.

In some examples, each respective spacecraft may transmit and/or receive RF signals only during periods of time when that respective spacecraft is at a latitude with magnitude greater than a safe latitude magnitude. In some examples, the safe latitude magnitude may be approximately 7.5°. In some examples, the constellation may be configured such that, at all times, at least one of the first spacecraft or the second spacecraft is at a latitude with magnitude greater than the safe latitude magnitude. In some examples, the constellation may be configured to provide continuous communications services to regions having a latitude between 55° N and 55° S.

According to some implementations, a method includes executing a stationkeeping strategy for a constellation of Earth-orbiting spacecraft. The constellation includes a first spacecraft disposed in a first orbit and a second spacecraft disposed in a second orbit. Each of the first orbit and the second orbit is substantially circular with a radius of approximately 42,164 km. The first orbit and the second orbit have a respective inclination with respect to the equator within a range of 5° to 20°. A separation between a first right ascension of ascending node (RAAN1) of the first orbit and a second RAAN (RAAN2) of the second orbit is approximately 90°. The stationkeeping strategy includes maintaining the separation at an approximately constant value of 90° while otherwise allowing RAAN1 and RAAN2 to drift.

In some examples, the first spacecraft and the second spacecraft may each be located at a substantially similar median longitude, and the constellation may be configured such that the first spacecraft reaches a point of maximum northerly latitude at approximately the same time that the second spacecraft is crossing the equator moving northward. In some examples, each respective spacecraft may transmit and/or receive RF signals only during periods of time when that respective spacecraft is at a latitude with magnitude greater than a safe latitude magnitude. In some examples, the safe latitude magnitude may be approximately 7.5°. In some examples, the constellation may be configured such that, at all times, at least one of the first spacecraft or the second spacecraft is at a latitude with magnitude greater than the safe latitude magnitude. In some examples, the constellation may be configured to provide continuous communications services to regions having a latitude between 55° N and 55° S.

According to some implementations, a constellation of Earth-orbiting spacecraft includes a first plurality of spacecraft disposed in a first orbit and a second plurality of spacecraft disposed in a second orbit. Each of the first orbit and the second orbit is substantially circular with a radius of approximately 42,164 km. The first orbit and the second orbit have a respective inclination with respect to the equator within a range of 5° to 20°. The first orbit has a first right ascension of ascending node (RAAN1) and the second orbit has a second RAAN (RAAN2) of approximately RAAN1+ 90°.

In some examples, a first spacecraft of the first plurality of spacecraft in the first orbit and a second spacecraft of the second plurality of spacecraft disposed in the second orbit may each be located at a substantially similar first median longitude, and a third spacecraft of the first plurality of spacecraft in the first orbit and a fourth spacecraft of the second plurality of spacecraft disposed in the second orbit may each be located at a substantially similar second median longitude that is substantially different from the first median longitude. In some examples, a fifth spacecraft of the first plurality of spacecraft in the first orbit and a sixth spacecraft of the second plurality of spacecraft disposed in the second orbit may each be located at a substantially similar third median longitude. In some examples, the first median longitude, the second median longitude and the third median longitude may be spaced apart by approximately 120°. In some examples, the constellation may be configured to provide global continuous communications services to regions having a latitude between 55° N and 55° S.

In some examples, the first orbit has a right ascension of ascending node (RAAN) of approximately 315° and the second orbit has a RAAN of approximately 45°.

In some examples, each respective spacecraft communicates with the ground only during periods of time when that respective spacecraft is at a latitude with magnitude greater than a safe latitude magnitude.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

DETAILED DESCRIPTION

The present disclosure relates to a constellation of satellites disposed in moderately inclined, circular, geosynchronous orbits (i.e., an orbit having a radius of 42,164 kilometers and an inclination to the equator within the range of about 5° to about 20°).

A known spacecraft constellation involving inclined (i~63.4°) geosynchronous orbits required three or more spacecraft disposed in elliptical (e>0.2) orbits to provide continuous coverage and only provided service to users at latitudes higher than 30° (Briskman, U.S. Pat. No. 6,223, 019). Another known spacecraft constellation involving inclined geosynchronous orbits only provided service to users at latitudes higher than 60° (Bigras, U.S. Pat. Pub. 2014/0017992).

The presently disclosed techniques enable a simpler, lower cost, constellation using as few as two spacecraft to provide service to a substantial portion of the GEO coverage latitudes, while avoiding interference with satellites operating in the GEO arc. In some implementations, the two spacecraft will operate from respective inclined (non-stationary) geosynchronous orbits. Although non-stationary, the spacecraft will exhibit limited apparent motion with respect to a ground station. For example, the apparent motion relative to the ground station may be restricted to a modest range of latitude, between for example 15° N and 15° S, and a narrower range of longitude, typically less than ±1°. Spacecraft in such an orbit will cross the plane of the equator twice per day and an operator of such spacecraft must avoid transmissions between the spacecraft and the ground at time proximate to those crossings, so as to avoid RF interference with spacecraft located in the GEO arc. Thus, the constellation may be configured such that each spacecraft transmits and receives only when sufficiently north or south of the equator to avoid such RF interference. During periods when the spacecraft is sufficiently north or south of the equator (i.e., at a "safe latitude") the spacecraft may communicate with both Northern and Southern Hemisphere ground sites. That is, each spacecraft, when north of the equator, may communicate with both Northern Hemisphere ground sites and Southern Hemisphere ground sites, and, when south of the equator, may communicate with both Southern Hemisphere ground sites and Northern Hemisphere ground sites.

The present disclosure contemplates that ground users requiring directional antennas would use antennas with somewhat more complexity than those adequate to communicate with GEO satellite since they would require two fields of view, one north and one south of the equator, or a wider field of view with a null in the middle to avoid interference with GEO satellites. Antenna technology has progressed to the point where such antennas are economical.

The present disclosure enables as few as two spacecraft to provide continuous coverage to a service region encompassing latitudes between about 55° N and 55° S. In some implementations, the service region may be the contiguous United States (CONUS). The disclosed techniques are also well suited for equatorial sites such as Singapore, Indonesia, Ecuador, parts of Brazil, Zaire and Kenya where the spacecraft elevations above the horizon when near maximum northerly orbital latitude and maximum southerly orbital latitude are nearly equal.

In an implementation, the constellation includes two spacecraft, each disposed in a respective, substantially circular (eccentricity e≈0), geosynchronous orbit, each orbit having a semi-major axis a=42,164 km). Each orbit has an inclination with respect to the equator of at least 5°. In some implementations, each respective inclination is in the range of 10-20°. In an example implementation described below and illustrated in FIG. 1, each orbit has an inclination i=15°.

Figure 1:
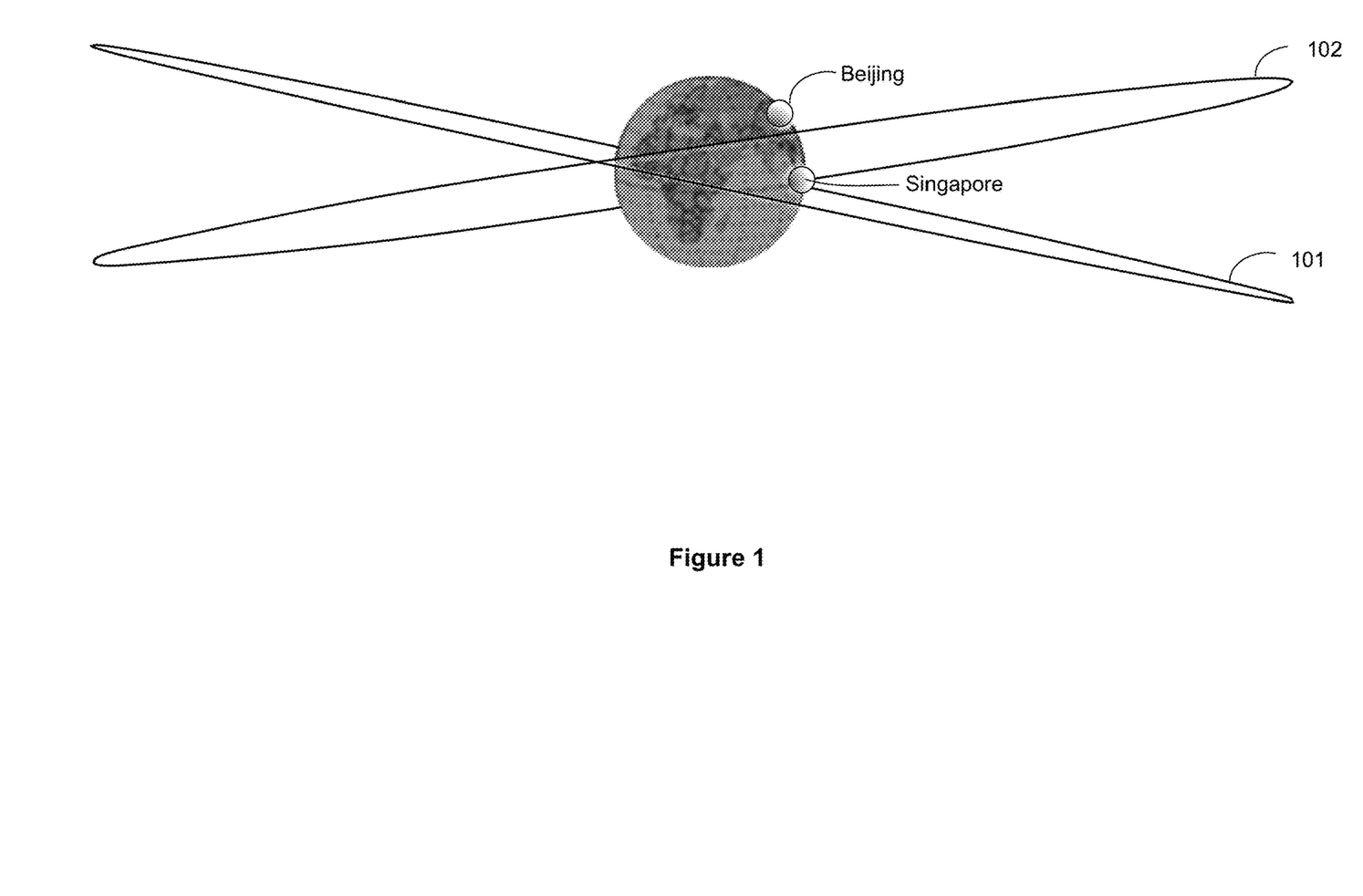
FIG. 1 illustrates moderately inclined orbits, according to an implementation.

Each orbit has a respective right ascension of ascending node (RAAN) that, advantageously, may be separated by 90°. In the example implementation described below, a first spacecraft (not illustrated) is disposed in a first orbit 101 of the two respective orbits and a second spacecraft (not illustrated) is disposed in a second orbit 102 of the two respective orbits. In an implementation, the first orbit 101 has a RAAN of −45° (315°) and the second orbit 102 of the two respective orbits has a RAAN of +45°.

Figure 2:
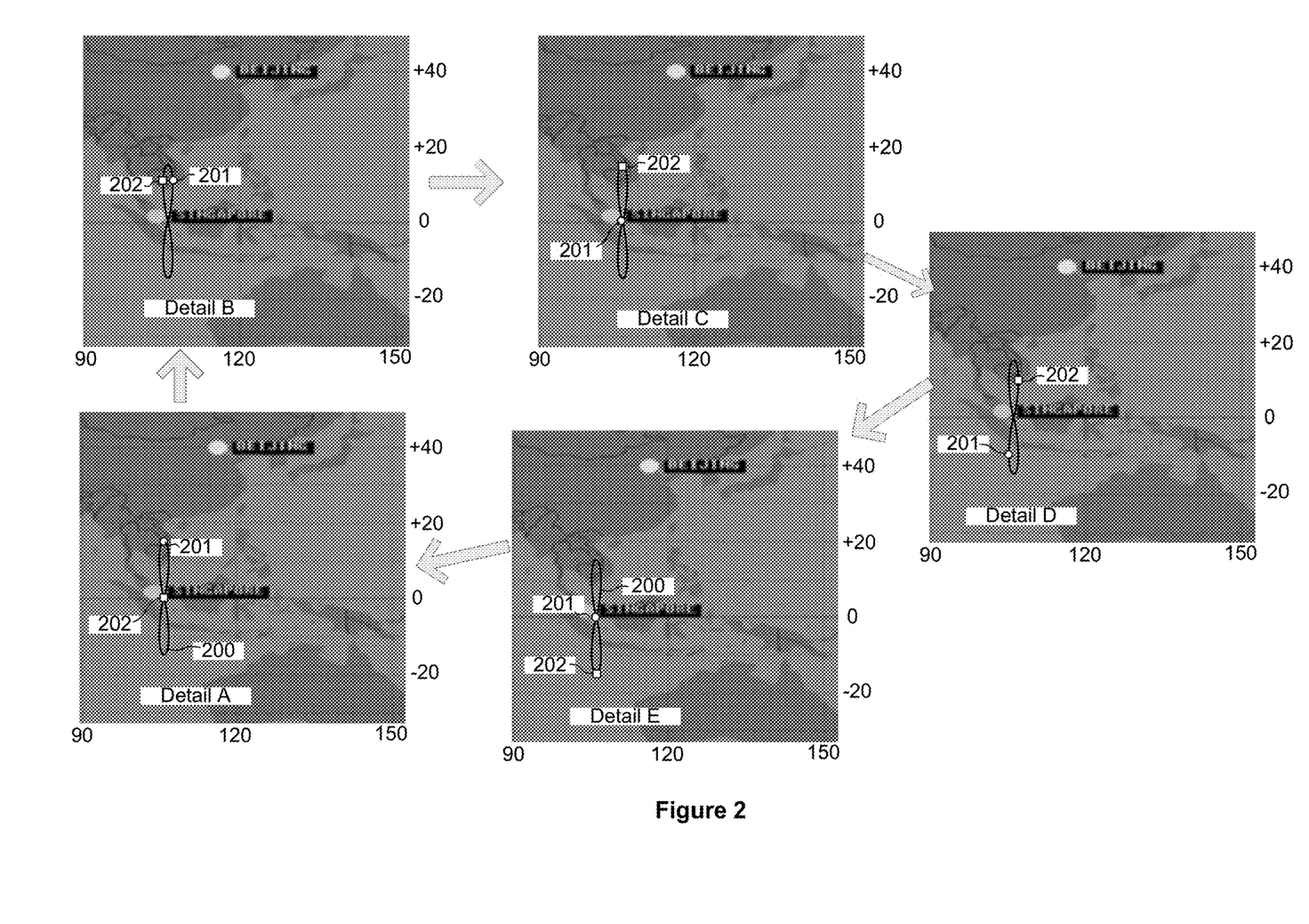
FIG. 2 illustrates satellite ground tracks, according to an implementation.

In the example implementation, as may be observed in FIG. 2, the constellation is configured such that there will always be one spacecraft at a latitude with an absolute value or magnitude greater than 10.5°, although the latitude will sometimes be North and sometimes be South. More particularly, the constellation is configured such that, at a first epoch (illustrated by Detail A), when a first spacecraft 201, having an apparent motion with respect to the ground illustrated by ground track 200, is at its maximum northerly latitude, a second spacecraft 202, likewise having an apparent motion with respect to the ground illustrated by the ground track 200, is crossing the equator moving northward. Although both spacecraft are disposed at a common meridian of longitude (approximately 105° E in the illustrated example) at the first epoch, the first spacecraft 201 is at 15° N latitude while the second spacecraft 202 is at the equator. At times proximate to the first epoch, only the first spacecraft 201, well separated in space from the GEO arc, carries communications traffic since, whereas communications between the second spacecraft 202 and the ground may be blanked, so as to avoid interference with spacecraft in GEO.

Referring still to FIG. 2, at a second epoch (illustrated by Detail B), when the first spacecraft 201 and the second spacecraft 202 are at a common latitude of approximately 10.7° N, the first spacecraft 201 is following the ground track 200 in a southward direction, whereas the second spacecraft 202 is following the ground track 200 in a northward direction. At times proximate to the second epoch there is a longitudinal separation of approximately 2° which results from the orbit inclination of 15°.

At a third epoch (illustrated by Detail C), the first spacecraft 201 is crossing the equator moving southward, and the second spacecraft 202 is at its maximum northerly latitude. At times proximate to the third epoch, only the second spacecraft 202, well separated in space from the GEO arc, carries communications traffic since, whereas communications between the first spacecraft 201 and the ground may be blanked, so as to avoid interference with spacecraft in GEO.

At a fourth epoch (illustrated by Detail D), both the first spacecraft 201 and the second spacecraft 202 are following the ground track 200 in a southward direction. At times proximate to the fourth epoch, the spacecraft 201 and the spacecraft 202 are separated by at least 21° latitude.

At a fifth epoch (Detail E), the first spacecraft 201 is crossing the equator moving northward, and the second spacecraft 202 is at its maximum southerly latitude. At times proximate to the fifth epoch, only the second spacecraft 202, well separated in space from the GEO arc, carries communications traffic since, whereas communications between the first spacecraft 201 and the ground may be blanked, so as to avoid interference with spacecraft in GEO.

It may be observed that the above described arrangement assures that there is never a time when both spacecraft are simultaneously within less than 10.5° of the equator. This may be more clearly seen in FIG. 3, which plots (in Detail F) latitude as a function of time of the first spacecraft 201 and the second spacecraft 202 and (in Detail G) the absolute value or magnitude of latitude of the satellite having the greater latitude of the two satellites. It may be observed that one satellite is always at least 10.5° away from the equator. More particularly, it may be observed that between Epoch 1 and Epoch 2, the spacecraft 201 is between 10.5° and 15° North latitude while spacecraft 202 is about 10° or less away from the equator; between Epoch 2 and Epoch 4, spacecraft 202 is between 10.5° and 15° North latitude, while spacecraft 201 transits from above 10° North latitude to below 10° South latitude; for approximately six hours subsequent to Epoch 4, spacecraft 201 is below 10.5° South latitude, while spacecraft 202 transits from above 10° North latitude to below 10° South latitude. During a subsequent six-hour period (from about three hours prior to Epoch 5 until about three hours subsequent to Epoch 5, the spacecraft 202 is below 10.5° South latitude, while the spacecraft 201 transits from below 10° South latitude to above 10° North latitude. Finally, during a subsequent three hour period starting about three hours after Epoch 5, the spacecraft 201 is above 10.5° North latitude while the spacecraft 202 is about 10° or less away from the equator.

As a result, the constellation may be configured to avoid interference with GEO spacecraft, while still providing uninterrupted service to a coverage region that extends from about 55° S to 55° N latitude. For example, the constellation may be configured such that each respective spacecraft transmits and/or receives RF signals only during periods of time when it is at a latitude with magnitude greater than the magnitude of a "safe" latitude. The safe latitude may be selected such that transmission and reception of RF signals above that latitude does not interfere with GEO spacecraft. The safe latitude may be, for example, about 7.5° away from the equator. In some implementations the magnitude of the safe latitude may be a selected latitude magnitude within the range of 5-15°.

Figure 3:
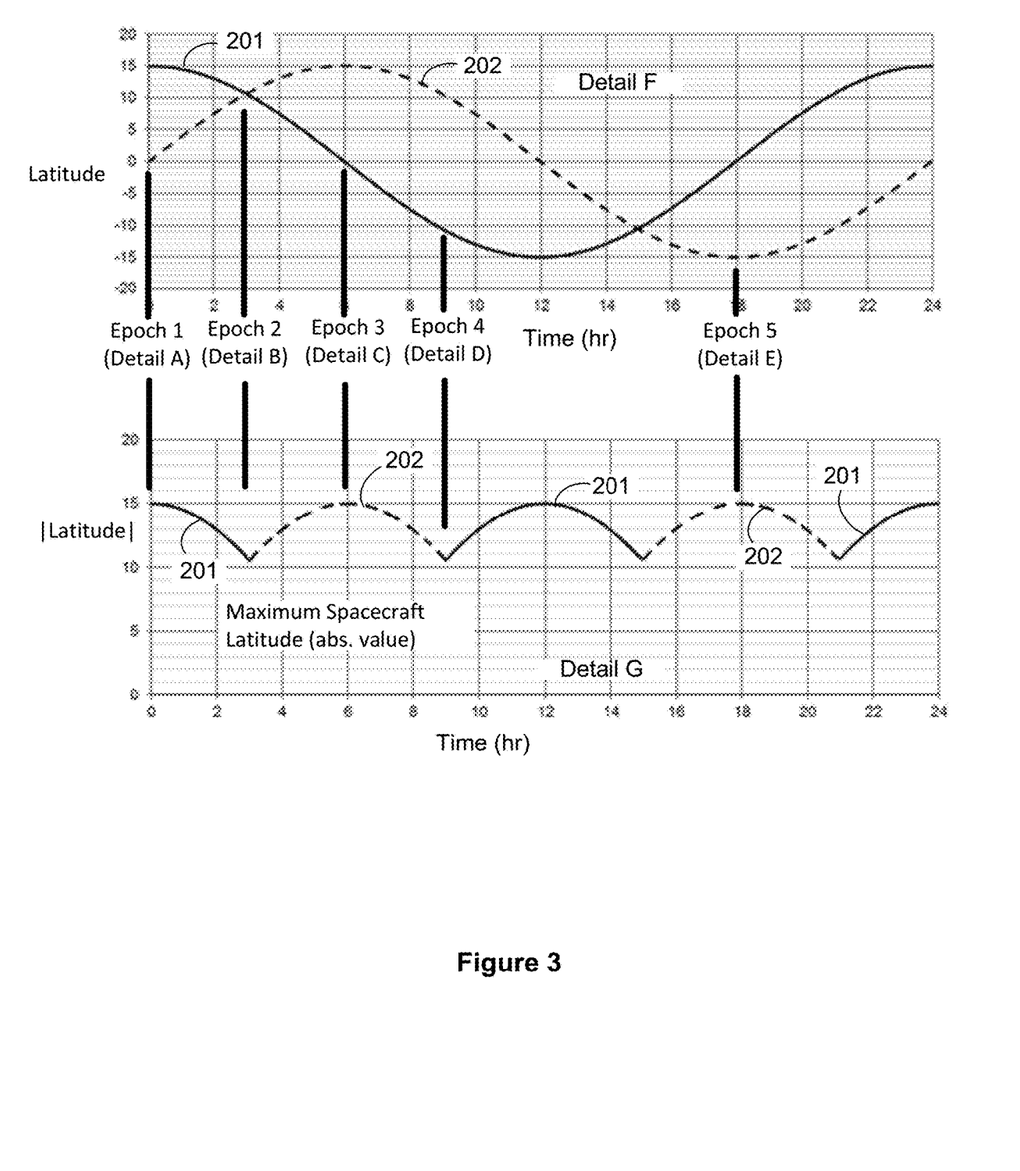
FIG. 3 illustrates example plots of latitude and absolute magnitude of latitude as a function of time, according to an implementation.

FIGS. 4A-4E illustrate a respective deep space view of the first spacecraft 201, disposed in the first orbit 101, and the second spacecraft 202, disposed in the second orbit 102, for each of the various epochs as described in FIGS. 2 and 3. In each of FIGS. 4A-4E, the deep space view is along a line (the "line of nodes") defined by the intersection of the equatorial plane and the orbit plane of the second orbit 102. As a result, the second orbit 102, viewed "edge-on", appears as a straight line, while the first orbit 101 appears as an ellipse, although it should be understood that both orbits, if viewed in a direction orthogonal to their respective orbit planes, would appear circular.

Figure 4A:
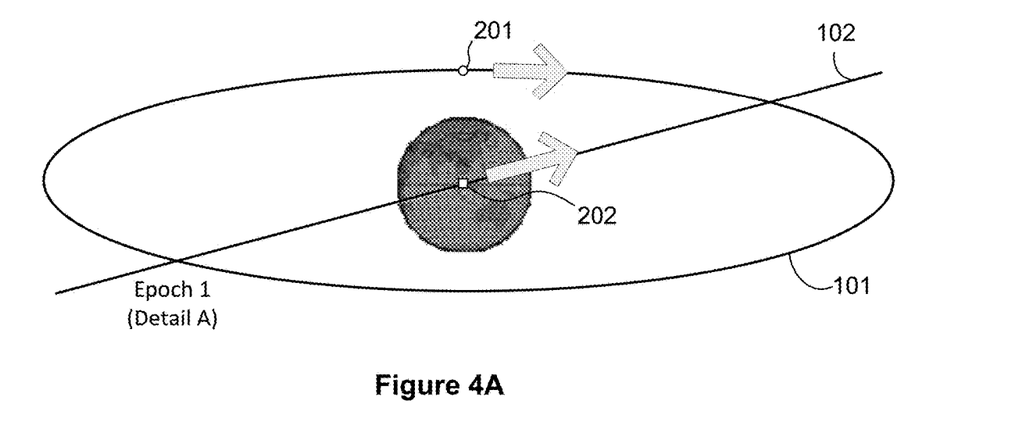
FIGS. 4A-4E illustrate a respective deep space view of a first spacecraft disposed in a first orbit 101, and a second spacecraft disposed in a second orbit for various epochs according to an implementation.

Referring to FIG. 4A, a deep space view corresponding to Epoch 1 (Detail A of FIG. 2) is presented. At Epoch 1, the line of nodes of second orbit 102 intersects a longitude of approximately 105° E, which is also the median longitude of service areas of the first spacecraft 201 and the second spacecraft 202 in the illustrated example. The first spacecraft 201 is shown to be at its maximum northerly latitude of approximately 15° north latitude; the second spacecraft 202 is shown crossing the equator moving northward.

Figure 4B:
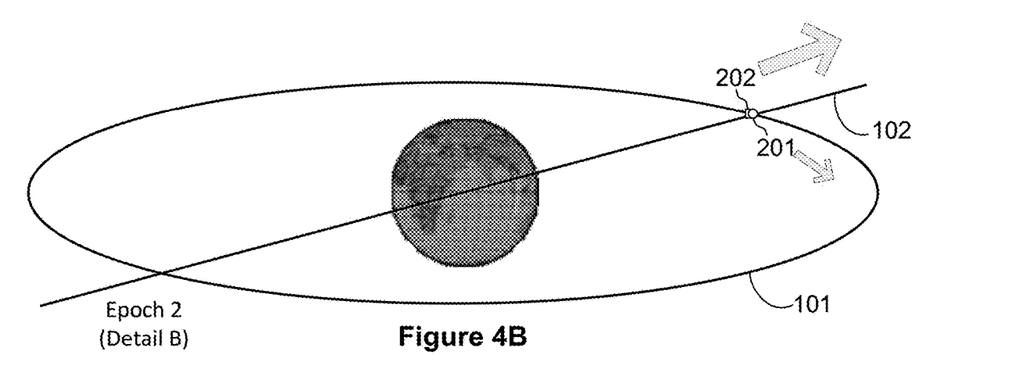

Referring to FIG. 4B, a deep space view corresponding to Epoch 2 (Detail B of FIG. 2) is presented. At Epoch 2, approximately three hours later than Epoch 1, the line of nodes of second orbit 102 intersects a longitude of approximately 60° E. The first spacecraft 201 and the second spacecraft 202 are shown as being at a common latitude of approximately 10.5° N. The first spacecraft 201 is shown to be following the orbit track 101 in a southerly direction, whereas the second spacecraft 202 is shown to be following the orbit track 102 in a northerly direction.

Figure 4C:
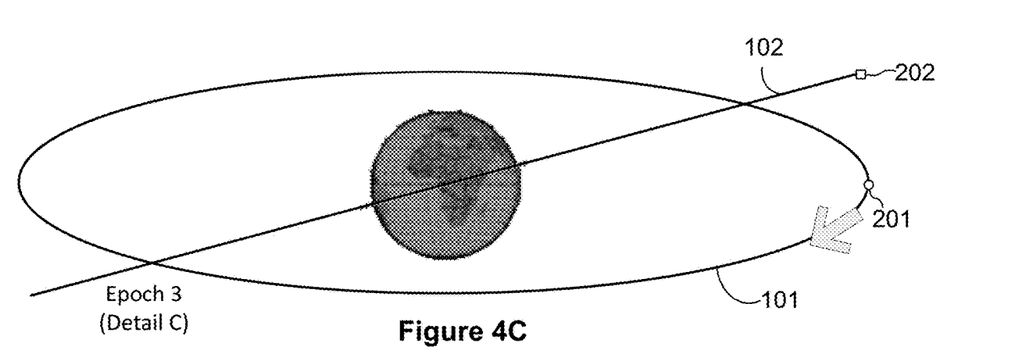

Referring to FIG. 4C, a deep space view corresponding to Epoch 3 (Detail C of FIG. 2) is presented. At Epoch 3, approximately three hours later than Epoch 2, the line of nodes of second orbit 102 intersects a longitude of approximately 15° E. The first spacecraft 201 is shown as crossing the equator while moving in a southerly direction along the orbit track 101, whereas the second spacecraft 202 is shown as having reached its maximum northerly latitude of approximately 15° north latitude.

Figure 4D:
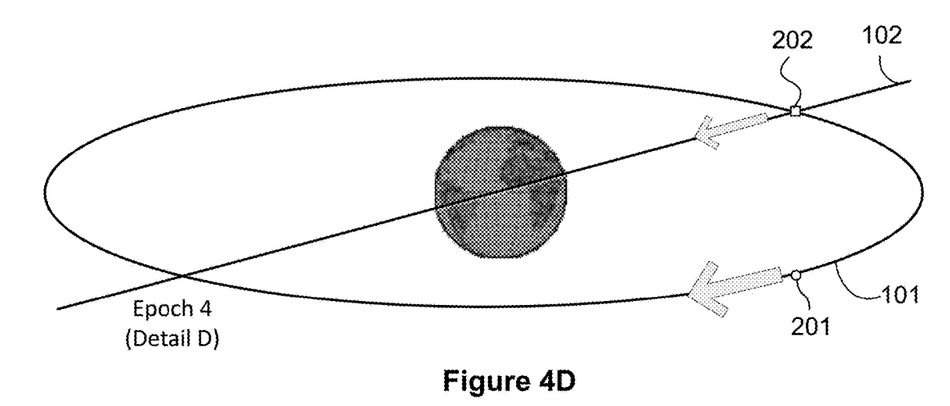

Referring to FIG. 4D, a deep space view corresponding to Epoch 4 (Detail D of FIG. 2) is presented. At Epoch 4, approximately three hours later than Epoch 3, the line of nodes of second orbit 102 intersects a longitude of approximately 30° W. The first spacecraft 201 and the second spacecraft 202 are each shown to be traveling in a southerly direction, following, respectively, the orbit track 101 and the orbit track 102. The first spacecraft 201 is at approximately 10.5° south latitude and the second spacecraft is at approximately 10.5° north latitude.

Figure 4E:
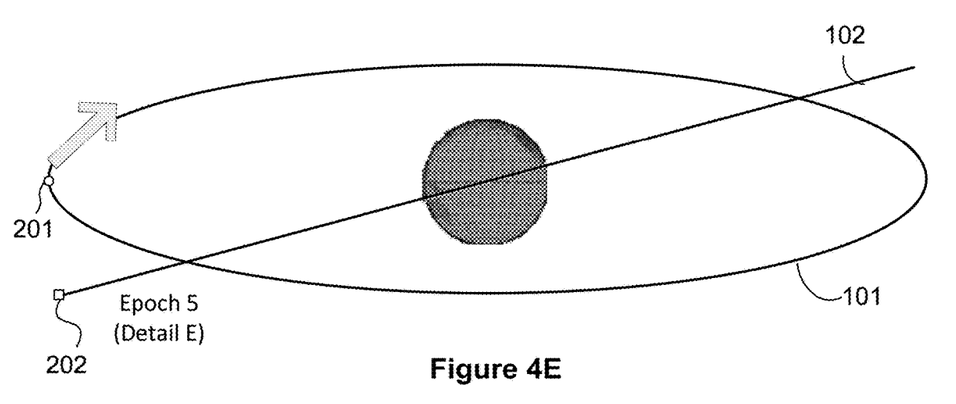

Referring to FIG. 4E, a deep space view corresponding to Epoch 5 (Detail E of FIG. 2) is presented. At Epoch 5, approximately nine hours later than Epoch 4, the line of nodes of second orbit 102 intersects a longitude of approximately 165° W. The first spacecraft 201 is shown as crossing the equator moving in a northerly direction along the orbit track 101, and the second spacecraft 202 has reached its maximum southerly latitude of approximately 15° south latitude.

Figure 5:
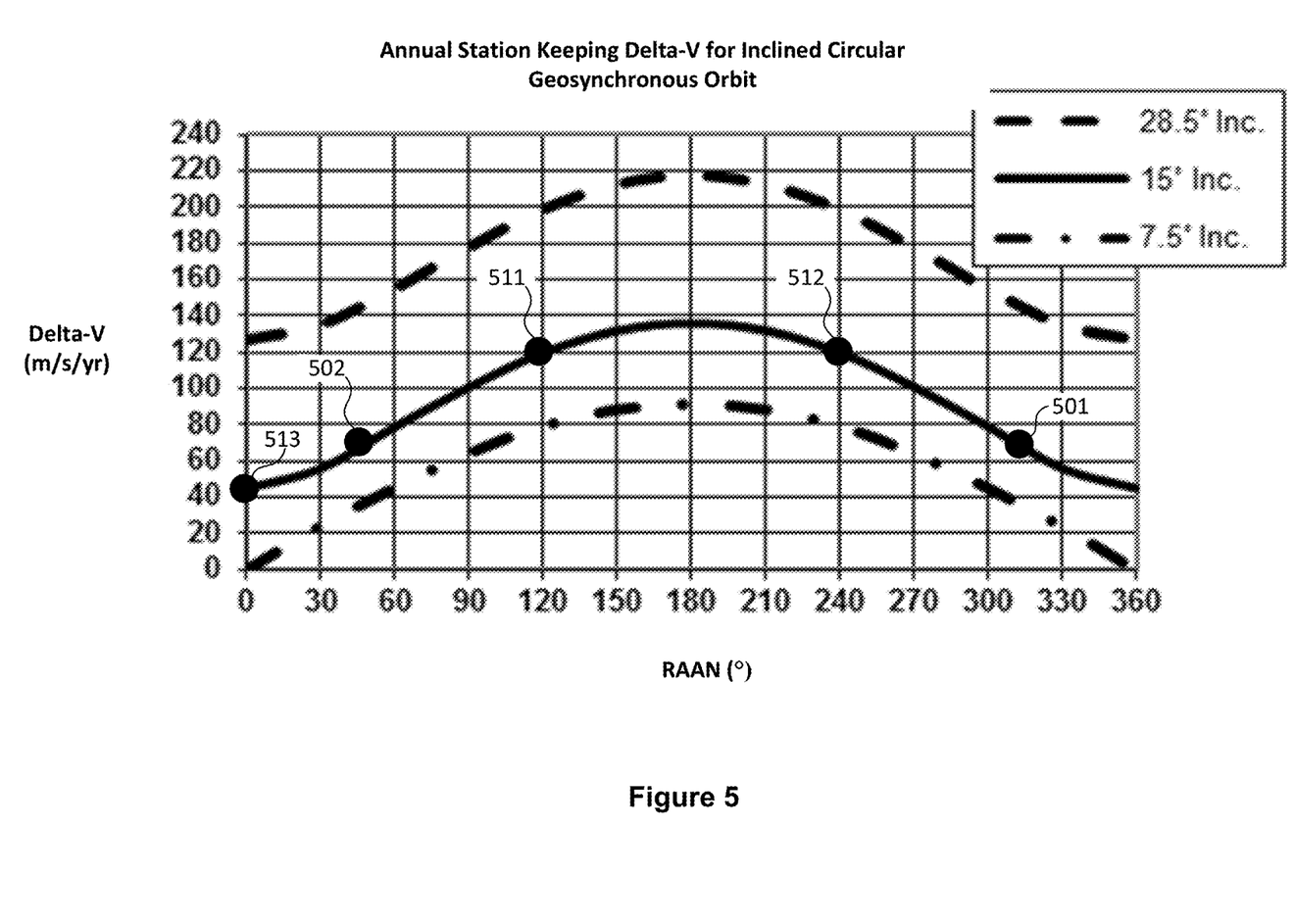
FIG. 5 depicts annual station keeping delta-V requirement for various combinations of RAAN and inclination.

In some implementations, it is contemplated to perform periodic stationkeeping maneuvers in order to maintain the inclination and/or RAAN of each orbit within a specified tolerance. Otherwise, inclination and RAAN will drift as a result, primarily, of the gravitational attraction of the moon and to a lesser extent as a result of the gravitational attraction of the sun. FIG. 5 depicts the annual station keeping delta-V requirement for various combinations of RAAN and inclination. In an implementation contemplated by the present disclosure (15° inclination, RAAN for the first spacecraft being 315° and RAAN for the second spacecraft being) 45°, station keeping delta-V for each satellite is about 70 m/s/yr as indicated by points 501 and 502.

The above-mentioned stationkeeping requirement, although significant, is substantially less than would be required in the absence of the presently disclosed techniques. For example, as disclosed by Briskman, a conventional constellation including multiple inclined orbit planes may be configured such that the spacecraft in the constellation pass over a given point on the earth at approximately equal time intervals. Where the orbit of each satellite occupies its own orbital plane and satellites in neighboring planes form a constellation of n satellites, the difference in right ascensions of the ascending nodes is 360°/n.

Applying the above teaching to the moderately inclined geosynchronous orbits contemplated by the present constellation would result, for the case of a two satellite constellation, in violating an objective of always having at least one spacecraft at a safe operating latitude. For the case of a three satellite constellation, the above-mentioned objective may be met, but the station keeping delta-V would be substantially higher than obtained using the presently disclosed techniques. That is, for a three satellite constellation with respective RAAN's of 0° 120° and 240°), the station keeping delta-V for the spacecraft at RAAN of 120° and 240° would each be 120 m/s/yr (FIG. 5, points 511 and 512) whereas the station keeping delta-V for the spacecraft at 0° would be 45 m/s/yr (point 513).

In some implementations, an even smaller delta-V may be obtained by allowing the RAAN values to drift. The difference in RAAN values for the two orbit planes would still be maintained at about 90° as described above, but the actual values of each orbit's RAAN may be allowed to vary. Thus, the first orbit may be established with a RAAN value of $RAAN_1$ and the second orbit with a RAAN value of $RAAN_2 = RAAN_1 + 90°$ or $RAAN1 - 90°$. In this implementation, the phasing is arranged so that when the spacecraft with the higher value of RAAN is at the ascending node, the spacecraft with the lower value of RAAN is at the north antinode.

Figure 6:
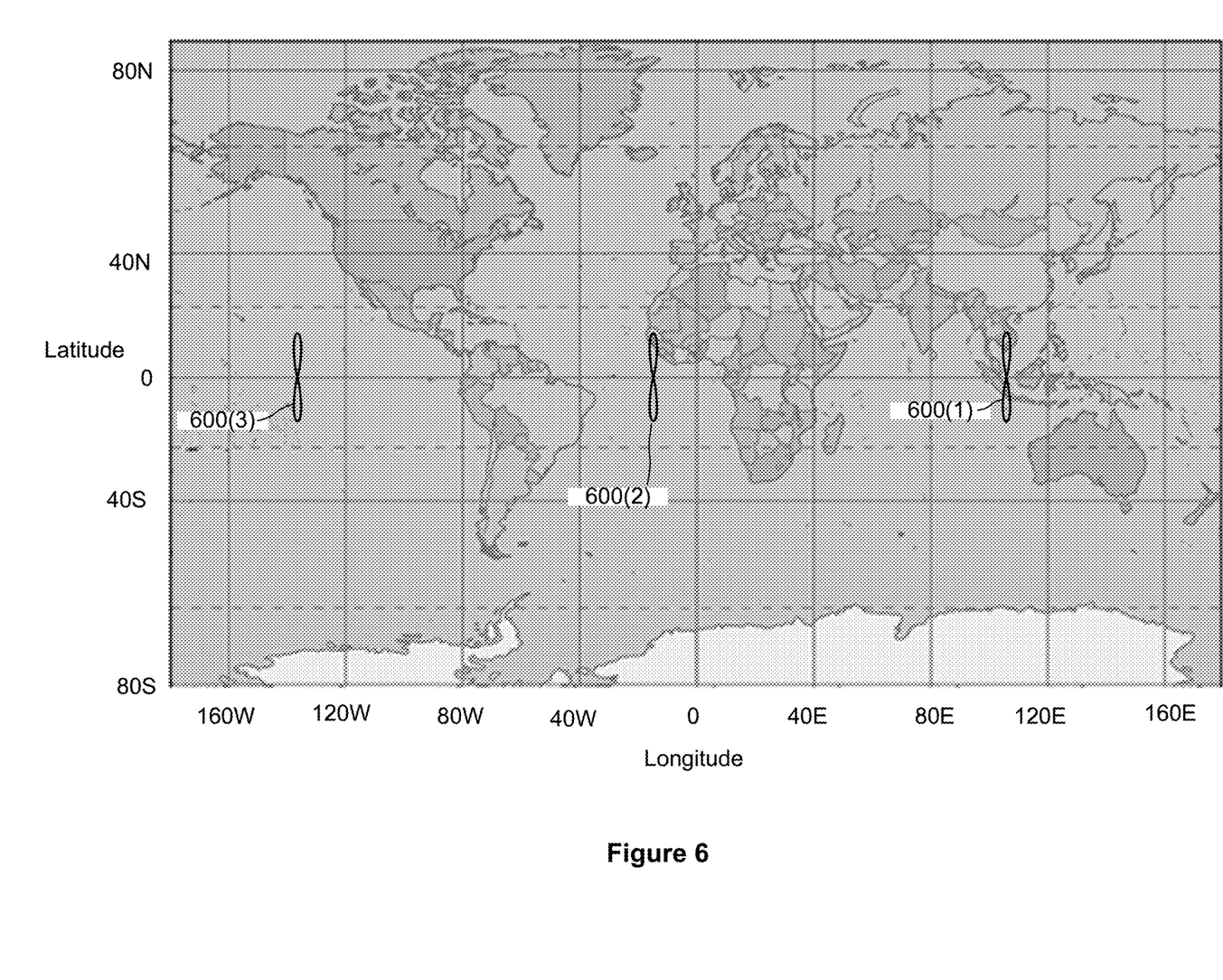
FIG. 6 illustrates satellite ground tracks, according to another implementation.

The above example described in detail a two satellite constellation, in which a first pair of satellites provides service to a coverage area centered at a single longitude (approximately 105° E). It is also contemplated that a second, third or yet additional pair(s) of spacecraft may each be disposed at substantially different respective longitudes. For example, as illustrated in FIG. 6, where a first pair of spacecraft are disposed at 105° E, following ground track 600(1), a second pair of spacecraft may be disposed at approximately 15° W, following ground track 600(2), and a third pair of pair of spacecraft may be disposed at approximately 135° W, following ground track 600(3), so as to provide near-global coverage, including coverage at all points in the tropics and most of the North and South Temperate Zones.

Figure 7:
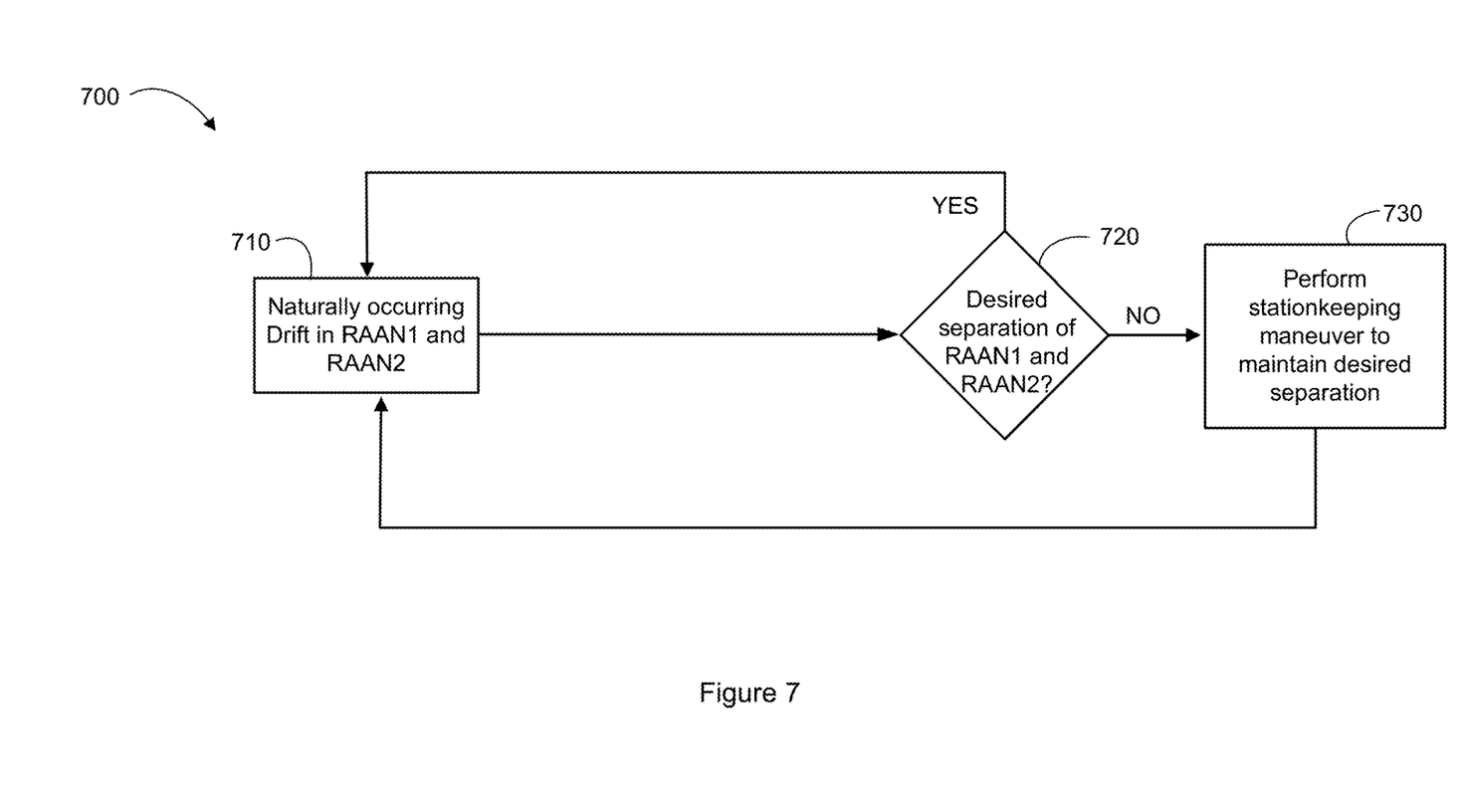
FIG. 7 illustrates a method of executing a stationkeeping strategy for a constellation of Earth-orbiting spacecraft.

Referring now to FIG. 7, a method 700 of executing a stationkeeping strategy for a constellation of Earth-orbiting spacecraft will be described. As indicated above, the constellation may include a first spacecraft disposed in a first orbit and a second spacecraft disposed in a second orbit, each of the first orbit and the second orbit being substantially circular with a radius of approximately 42,164 km, the first orbit and the second orbit having a respective inclination with respect to the equator within a range of 5° to 20°; a separation between a first right ascension of ascending node (RAAN1) of the first orbit and a second RAAN (RAAN2) of the second orbit being approximately 90°.

At block 710, naturally occurring forces may cause drift in one or both of RAAN1 and RAAN2. At block 720, a determination may be made as to whether or not a desired separation of RAAN1 and RAAN2 exists. The desired separation may be regarded as a range that includes the approximately 90° value identified above. For example, if the actual separation is within a range of 89-91° the determination at block 720 may be that the desired separation exists, and the method returns to block 710. On the other hand, if the determination at block 720 is that the desired separation does not exist, the method may proceed to block 730.

At block 730, a stationkeeping maneuver may be performed in order to return the separation to within the desired range. Advantageously, in accordance with this method, RAAN1 and RAAN2 are otherwise allowed to drift. That is, the difference in RAAN values for the two orbit planes is maintained at 90°, but the actual values of each orbit's RAAN may be allowed to vary.

Thus, techniques for providing uninterrupted coverage to a substantial portion of GEO coverage latitudes from a moderately inclined geosynchronous orbit using a constellation consisting of as few as two spacecraft has been described. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A constellation of Earth-orbiting spacecraft, the constellation comprising:
a first pair of spacecraft, the pair of spacecraft consisting of a first spacecraft disposed in a first orbit and a second spacecraft disposed in a second orbit, wherein:
the first spacecraft and the second spacecraft are each located at a substantially similar median first longitude and the constellation includes no other spacecraft located at the median first longitude;
each of the first orbit and the second orbit is a substantially circular geosynchronous orbit with a radius of approximately 42,164 km;
the first orbit and the second orbit have a respective inclination with respect to the equator within a range of 5° to 20°; and
the first orbit has a first right ascension of ascending node (RAAN1) and the second orbit has a second right ascension of ascending node (RAAN2) of approximately RAAN1+90°.

2. The constellation of claim 1, wherein:
the constellation is configured such that the first spacecraft reaches a point of maximum northerly latitude at approximately the same time that the second spacecraft is crossing the equator moving northward.

3. The constellation of claim 1, wherein the first orbit has a right ascension of ascending node (RAAN) of approximately 315° and the second orbit has a RAAN of approximately 45°.

4. The constellation of claim 1, wherein each respective spacecraft transmits and/or receives RF signals only during periods of time when that respective spacecraft is at a latitude with magnitude greater than a safe latitude magnitude.

5. The constellation of claim 4, wherein the safe latitude magnitude is approximately 7.5°.

6. The constellation of claim 4, wherein the constellation is configured such that, at all times, at least one of the first spacecraft or the second spacecraft is at a latitude with magnitude greater than the safe latitude magnitude.

7. The constellation of claim 4, wherein the constellation is configured to provide continuous communications services to regions having a latitude between 55° N and 55° S.

8. A method comprising:
executing a stationkeeping strategy for a constellation of Earth-orbiting spacecraft, wherein:
the constellation includes a first pair of spacecraft, the pair of spacecraft consisting of a first spacecraft disposed in a first orbit and a second spacecraft disposed in a second orbit;
the first spacecraft and the second spacecraft are each located at a substantially similar median first longitude and the constellation includes no other spacecraft located at the median first longitude;
each of the first orbit and the second orbit is a substantially circular geosynchronous orbit with a radius of approximately 42,164 km;
the first orbit and the second orbit have a respective inclination with respect to the equator within a range of 5° to 20° ;
a separation between a first right ascension of ascending node (RAAN1) of the first orbit and a second right ascension of ascending node (RAAN2) of the second orbit is approximately 90°; and
the stationkeeping strategy includes maintaining the separation at an approximately constant value of 90° while otherwise allowing RAAN1 and RAAN2 to drift.

9. The method of claim 8, wherein:
the constellation is configured such that the first spacecraft reaches a point of maximum northerly latitude at approximately the same time that the second spacecraft is crossing the equator moving northward.

10. The method of claim 9, wherein each respective spacecraft transmits and/or receives RF signals only during periods of time when that respective spacecraft is at a latitude with magnitude greater than a safe latitude magnitude.

11. The method of claim 10, wherein the safe latitude magnitude is approximately 7.5°.

12. The method of claim 10, wherein the constellation is configured such that, at all times, at least one of the first spacecraft or the second spacecraft is at a latitude with magnitude greater than the safe latitude magnitude.

13. The method of claim 10, wherein the constellation is configured to provide continuous communications services to regions having a latitude between 55° N and 55° S.

14. A constellation of Earth-orbiting spacecraft, the constellation comprising:
a first plurality of spacecraft disposed in a first orbit and a second plurality of spacecraft disposed in a second orbit, wherein:
each of the first orbit and the second orbit is a substantially circular with a radius of approximately 42,164 km;
the first orbit and the second orbit have a respective inclination with respect to the equator within a range of 5° to 20°;
a first spacecraft of the first plurality of spacecraft and a second spacecraft of the second plurality of spacecraft are each located at a substantially similar first median longitude and the constellation includes no other spacecraft located at the median first longitude; and
the first orbit has a first right ascension of ascending node (RAAN1) and the second orbit has a second RAAN (RAAN2) of approximately RAAN1+90°.

15. The constellation of claim 14, wherein:
a third spacecraft of the first plurality of spacecraft in the first orbit and a fourth spacecraft of the second plurality of spacecraft disposed in the second orbit are each located at a substantially similar second median longitude that is substantially different from the first median longitude.

16. The constellation of claim 15, wherein:
a fifth spacecraft of the first plurality of spacecraft in the first orbit and a sixth spacecraft of the second plurality of spacecraft disposed in the second orbit are each located at a substantially similar third median longitude.

17. The constellation of claim 16, wherein the first median longitude, the second median longitude and the third median longitude are spaced apart by approximately 120°.

18. The constellation of claim 16, wherein the constellation is configured to provide global continuous communications services to regions having a latitude between 55° N and 55° S.

19. The constellation of claim 14, wherein the first orbit has a right ascension of ascending node (RAAN) of approximately 315° and the second orbit has a RAAN of approximately 45°.

20. The constellation of claim 14, wherein each respective spacecraft communicates with the ground only during periods of time when that respective spacecraft is at a latitude with magnitude greater than a safe latitude magnitude.

* * * * *